United States Patent
Brewer

(10) Patent No.: US 9,626,008 B2
(45) Date of Patent: Apr. 18, 2017

(54) STYLUS-BASED REMOTE WIPE OF LOST DEVICE

(71) Applicant: BARNES & NOBLE COLLEGE BOOKSELLERS, LLC, Basking Ridge, NJ (US)

(72) Inventor: Dale J. Brewer, San Marcos, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 356 days.

(21) Appl. No.: 13/793,310

(22) Filed: Mar. 11, 2013

(65) Prior Publication Data

US 2014/0253466 A1     Sep. 11, 2014

(51) Int. Cl.
*G06F 3/0354* (2013.01)
*G06F 3/0488* (2013.01)
*G06F 21/88* (2013.01)

(52) U.S. Cl.
CPC ........ *G06F 3/03545* (2013.01); *G06F 3/0488* (2013.01); *G06F 21/88* (2013.01); *G06F 2221/2143* (2013.01)

(58) Field of Classification Search
CPC .... G06F 3/03545; G06F 21/62; G06F 3/0488; G06F 21/88; G06F 2221/2143; H04W 12/06
USPC ...................... 345/173–183; 178/18.01–20.04
See application file for complete search history.

(56) References Cited

U.S. PATENT DOCUMENTS

| | | | |
|---|---|---|---|
| 4,896,543 A | 1/1990 | Gullman | |
| 5,475,401 A * | 12/1995 | Verrier | G06F 3/0418 178/18.03 |
| 5,633,471 A | 5/1997 | Fukushima | |
| 5,844,557 A | 12/1998 | Shively, II | |
| 6,259,438 B1 | 7/2001 | Fleck et al. | |
| 6,424,338 B1 * | 7/2002 | Anderson | G06F 3/0213 178/18.01 |
| 6,956,564 B1 | 10/2005 | Williams | |
| 7,649,524 B2 | 1/2010 | Haim et al. | |

(Continued)

FOREIGN PATENT DOCUMENTS

EP       0722150 A1     7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Kumar Patel
*Assistant Examiner* — Vinh Lam
(74) *Attorney, Agent, or Firm* — Finch & Maloney PLLC

(57) ABSTRACT

Techniques for remotely wiping data from a computing device are provided. Instructions for wiping data from the computing device can be sent via an input device such as a stylus associated with the computing device, or a dedicated module. In cases where the computing device is lost or stolen, the user, via the stylus, may remotely activate a data wipe function so as to remove selected or all information from the computing device, ensuring that sensitive information is not extracted from the device. In some cases, a back-up application configured to remotely back-up data of the target computing device is launched before that data is wiped from the device.

19 Claims, 9 Drawing Sheets

(56) References Cited

U.S. PATENT DOCUMENTS

| | | | |
|---|---|---|---|
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| 8,302,185 B2* | 10/2012 | Little | G06F 21/30 726/21 |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2007/0047002 A1 | 3/2007 | Hull et al. | |
| 2007/0139399 A1* | 6/2007 | Cook | G06F 3/03545 345/179 |
| 2008/0036747 A1 | 2/2008 | Hope | |
| 2009/0135149 A1* | 5/2009 | Taniuchi | G06F 3/04845 345/173 |
| 2009/0251337 A1* | 10/2009 | Marggraff | G06F 3/03545 341/20 |
| 2010/0020103 A1* | 1/2010 | Ure | G06F 1/1624 345/660 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0074561 A1* | 3/2011 | Mackjust | B60R 25/10 340/426.13 |
| 2011/0169765 A1* | 7/2011 | Aono | G06F 3/016 345/173 |
| 2011/0258542 A1 | 10/2011 | Kenney et al. | |
| 2012/0019487 A1* | 1/2012 | Kazamaki | G06F 17/241 345/179 |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0093733 A1* | 4/2013 | Yoshida | G06F 3/0321 345/179 |
| 2013/0106800 A1* | 5/2013 | Yilmaz | G06F 3/03545 345/179 |
| 2013/0113699 A1 | 5/2013 | Lim | |
| 2013/0120271 A1 | 5/2013 | Lee et al. | |
| 2013/0135220 A1* | 5/2013 | Alameh | G06F 3/041 345/173 |
| 2013/0135234 A1 | 5/2013 | Hisano et al. | |
| 2013/0135262 A1* | 5/2013 | Alameh | G06F 3/0383 345/179 |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0246558 A1* | 9/2013 | Bacastow | G06F 21/305 709/217 |
| 2013/0337743 A1* | 12/2013 | Holtmanns | H04W 76/02 455/39 |
| 2014/0028577 A1* | 1/2014 | Krah | G06F 3/0416 345/173 |
| 2014/0043245 A1* | 2/2014 | Dowd | G06F 3/03545 345/173 |
| 2014/0104198 A1* | 4/2014 | Kao | G06F 3/03545 345/173 |
| 2014/0160089 A1* | 6/2014 | Fletcher | G06F 3/0383 345/179 |
| 2014/0168177 A1* | 6/2014 | Mkrtchyan | G06F 3/041 345/179 |
| 2014/0188804 A1* | 7/2014 | Gokhale | G06F 21/6218 707/645 |
| 2016/0005150 A1* | 1/2016 | Ghassabian | G06F 3/0488 345/654 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.
"Bamboo Stylus," Wacom Americas, http://www.wacom.com/en/products/stylus, 5 pages, printed from the Internet on Jun. 20, 2013.
Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.
"Pen," DuoSense Pen, N-trig Hands-on computing, http://www.n-trig.com/Content.aspx?Page=DigitalPencil, 3 pages, printed from the Internet on Jun. 20, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

(56) References Cited

OTHER PUBLICATIONS

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"Explaining how the sPen tech works (and is very diff than other styluses)," http://forum.xda-developers.com/showthread.php?t=, 1 page, printed from the Internet on Jan. 15, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

* cited by examiner

STYLUS-BASED REMOTE WIPE OF LOST DEVICE

FIELD OF THE DISCLOSURE

This disclosure relates to electronic computing devices, and more particularly, to user interface techniques for remotely interacting with electronic computing devices.

BACKGROUND

Electronic computing devices such as tablets, eReaders, mobile phones, smart phones, personal digital assistants (PDAs), GPS devices, and other such touch screen electronic computing devices are commonly used for displaying, receiving and transmitting consumable content. The content may be, for example, an eBook, an online article or blog, images, documents, email, music, a movie or a video, just to name a few. Such computing devices are also useful for displaying a user interface that allows a user to interact with files and other content on the device. The user interface may include, for example, one or more touch screen controls and/or one or more displayed labels that correspond to nearby hardware buttons. The user may interact with the touch sensitive device using fingers, a stylus, or other implement. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor). The devices may also be configured to wirelessly communicate via a network such as the Internet.

DETAILED DESCRIPTION

Figure 1A:
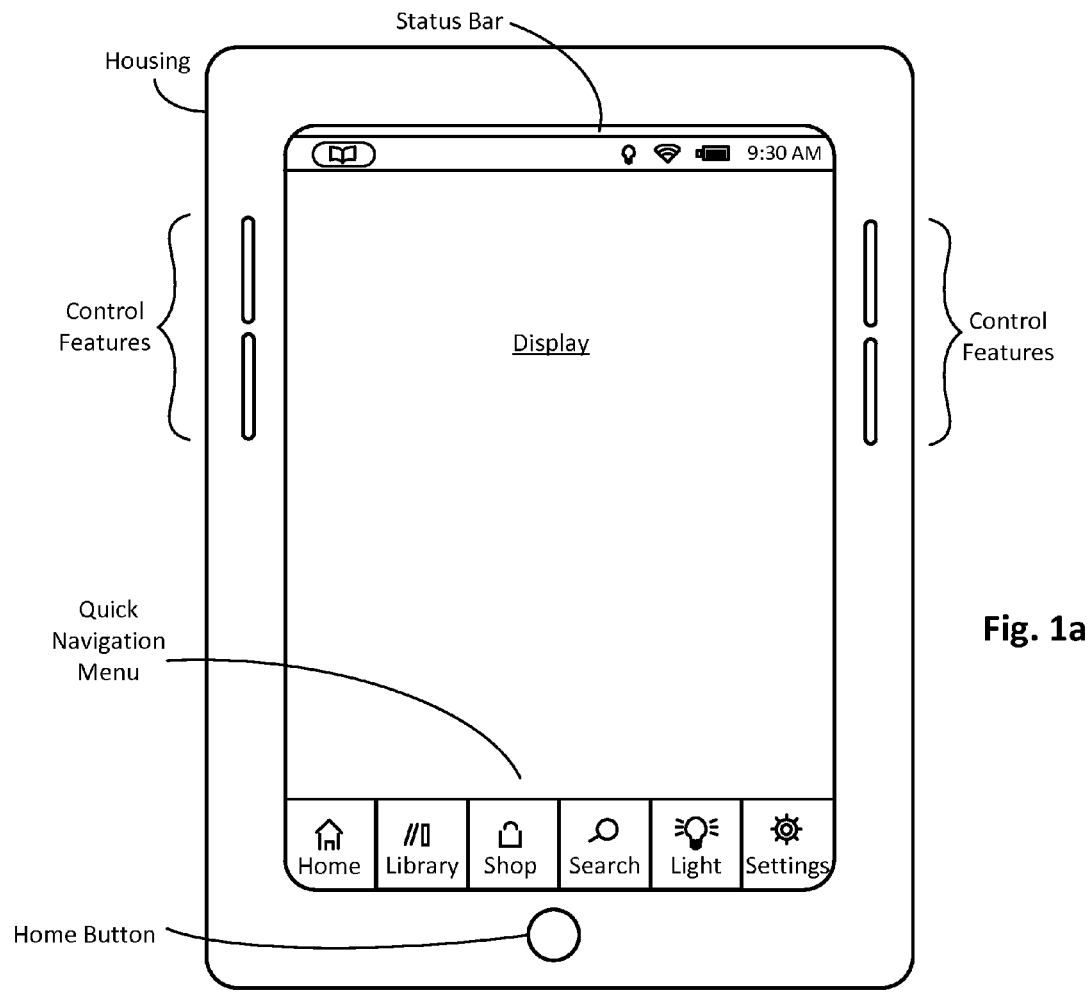
FIGS. 1a-b illustrate an example electronic computing device configured in accordance with an embodiment of the present invention.

Techniques for remotely wiping data from a lost electronic computing device are described. In one aspect, a separate input device that has been previously paired with the electronic computing device can be used to wipe data from the electronic computing device when the electronic computing device has been lost or otherwise separated from the input device. In one such embodiment, the input device is a stylus. In such cases, the stylus may have been previously paired with the computing device by, for example, a wireless communication discovery protocol. The stylus can be configured to send data wipe instructions when activated by an authorized user. The data wipe instructions can be transmitted across a network to the target computing device, which can be programmed or otherwise configured to engage a data wipe routine in response to receiving such instruction, thereby wiping select data or all data from the target computing device. In other embodiments, the techniques can be implemented in a dedicated data wipe module that has no other purpose other than to engage the data wipe function as described herein. In any such cases, the previous pairing of the input device and the computing device effectively allows the user to keep a small, portable, unobtrusive object, such as a stylus, in his or her possession, and this conveniently held device can subsequently be used to wipe data from the paired electronic computing device that may have been lost or stolen. Note that the data wipe instructions can be conveniently sent using the stylus or dedicated data wipe module alone, in the absence of any other input device or computing system. For example, in some embodiments, a keyboard, keypad, mouse, phone, and computer may all be absent and unnecessary for purpose of wiping the lost target device. In some embodiments, a data back-up service can be engaged just prior to the data wipe operation commencing, thereby allowing the user to remotely back-up data of the lost computing device to a secure location (e.g., recovery server or home computer). In this way, the user is able to recover the wiped data, and can restore that data should the lost computing device be recovered or replaced. The user may also be able to remotely engage a lock screen mode, so as to provide at least some protection against unauthorized access of the lost computing device.

Data is considered 'wiped' when it has been deleted or rendered unavailable on the target computing device. A stylus or other such input device or dedicated module is 'associated' or 'paired' with a computing device when the stylus or other input device or dedicated module is specifically paired with the target computing device and not paired with other computing devices of similar or identical types. The pairing may be based, for example, on software and/or hardware based discovery and identification schemes that use, for instance, IP addresses, MAC addresses, and/or other unique IDs that can be searched for and located for purposes inter-device communication using established network infrastructure including any public and/or private networks (e.g., Internet, home network, café network, office network, etc). In this sense, wipe commands from the stylus or other input device or dedicated module will only engage a wipe function on the paired target computing device, and not on any other computing devices, in accordance with some embodiments. For example, in various such embodiments, the associated computing device may only receive or execute data wipe instructions from a stylus that possesses a unique ID or is otherwise uniquely recognized by that computing device. A target electronic computing device is accessed 'remotely' when it is outside of the control of the user, for example, when it has been lost or stolen or otherwise left in a physical place that is not known or accessible to the rightful user for whatever reason. As will be further appreciated, a stylus is a pen-like implement that can be used by a user to interact with a touch sensitive surface (e.g., such as a touch screen display or trackpad) of a computing device so as to allow the user to provide input to that device. The stylus may provide such user input by directly contacting the touch sensitive surface and/or by hovering proximate (e.g., within a few centimeters) the touch sensitive surface.

GENERAL OVERVIEW

Remote wipe functions are currently available for removing data from a lost or misplaced computing device such as a smart phone or table. However, these data wipe functions generally require the user to have access to another computing system (e.g., keyboard, mouse/trackpad, display, etc) and/or network access to a website that can be used to facilitate the remote wipe process. However, such facilities may not always be available or otherwise convenient to the user of the lost or misplaced computing device. Moreover, any data on the wiped device is permanently lost, which is particularly frustrating when the lost device may actually be in a safe place (e.g., under seat of friend's car, or in teacher's desk drawer, or in café manager's office, etc) and ultimately returned to the rightful user. For instance, a busy student may be on her/his way to an important exam or class and realize that she/he left the subject computing device in the library or a coffee shop or other public venue where return of the device to the student is unlikely depending on who finds it first. In such a stressful situation, it would be better for the student to be able to seamlessly and easily engage a remote wipe process while continuing to the exam room or class. If the student had to stop at a computer kiosk or otherwise access another keyboard-based computing device to conduct this remote wipe process, there would be the significant risk of being late and/or shut out of the exam or class. The alternative would be for the student to wait until after the exam or class, but this option comes with the stress of the student knowing that someone could be improperly accessing their lost computing which would likely be very distracting at a time when the student should clearly be focusing on the exam or classroom instruction. Likewise, the student would be losing all the important data on the target device to be wiped, and such lost data may be needed for future study sessions or classroom activity, etc.

Thus, and in accordance with one embodiment of the present invention, techniques for remotely wiping data from a lost electronic computing device are described. The electronic computing device may be, for example, a tablet, smartphone, laptop, or other such portable computing device including a keypad or keyboard or virtual keypad/keyboard along with a display screen) that is susceptible to being lost or misplaced. In some embodiments, a portable input device is securely associated with the electronic computing device, and can be used to remotely initiate the data wipe function. The portable input device may be, for example, a stylus. As used herein, however, the remote wipe features and functions of a stylus configured in accordance with an embodiment of the present invention are applicable to other suitable portable input devices and dedicated data wipe modules, as will be appreciated in light of this disclosure. As such, it will further be appreciated that although various examples provided herein refer to a stylus-based remote wipe function, other form factors and compact portable housings of comparable size can be used, but the term stylus will be used throughout the disclosure for simplicity and clarity.

A stylus configured in accordance with an embodiment of the present invention may include, for example, a power supply, memory, a processor and/or a transceiver for wireless communication. The stylus may be capable of accessing a network (e.g., both public and private, as needed) via either a wired connection or a wireless communication link implemented with, for example, Wi-Fi. Bluetooth, cellular, and/or other such suitable wireless protocols. The stylus may also communicate with the associated electronic computing device via a wireless communication link (e.g., near-field communication or NFC, Bluetooth, and/or proprietary communication protocol) or wired access, and this communication link can be the same as the communication link by which the stylus communicates to the network or in addition to that communication link, as the case may be. The stylus may also include one or more control features, such as one or more press-button switches, a rotary switch, or other such control features that can be used, among other things, to activate the remote data wipe function, as described herein. The stylus may also include input and output devices for sound such as a microphone (e.g., so as to allow voice commands for activating the remote data wipe function) and/or a sound generating device such as a speaker (e.g., to aurally present feedback to the user regarding a requested remote data wipe). The stylus may also include one or more indicators, including, for example, light output devices such as LEDs and/or a digital alpha numeric readout (e.g., to visually present feedback to the user regarding a requested remote data wipe). In some embodiments, the stylus may include one or more connectors for communicating with another device via a wired connection. Connectors may include, for example, a USB, micro USB, or an optical connector.

The electronic computing device may include, for example, a menu that allows the user to activate and/or configure a remote data wipe option. The data wipe menu may include an option for wiping data from the electronic computing device remotely via a stylus or alternative portable device. When data is wiped from the electronic computing device it can be made inaccessible to anyone using the electronic device. In some embodiments, the stylus may send instructions to a network and the instructions may be relayed to the electronic computing device via that network. The 'network' may include, for example, any private and/or public networks, such as any network local to the user, the Internet, and any network local to the lost computing device.

Upon receipt of the data wipe instructions from the stylus, the electronic computing device may initiate a data wipe sequence that, in some embodiments, irretrievably deletes or renders inaccessible all data on the computing device. Other options may also be presented to the user. For example, the user may limit the amount or type of data that is wiped from the device. For instance, the wiped data may be limited to sensitive data such as personal information or work related documents. Options may also be presented for remotely or automatically backing-up any data to be wiped clean using an established data back-up service via the given network. Options may also be presented for remotely or automatically displaying messages upon powering up the computing device after wiping data from the device. For example, in one embodiment the device may be programmed to display 'Reward for Return—call 987-654-3210. Note that this device has been rendered unusable by an internal security mechanism and any unauthorized access attempts will be reported to local authorities along with geolocation data.' This may be the only screen accessible to someone booting up a remotely wiped device. In other embodiments, a geolocation positioning system in the computing device may remain active and may send data to a network. For instance, upon boot up, the computing device may immediately transmit its location to a server, network, smart phone, email address or other device or location. In this manner, as soon as a computing device can connect to a network, it will send its geolocation information to an address that allows the location information to be viewed by the owner or a security service tasked with recovering lost devices (e.g., local police, campus security, private recovery agency, etc). The computing device may continue to send such messages at pre-determined intervals, and the transmission of this information can be either invisible or visible to an unauthorized party in possession of the computing device.

In some cases, remote data wipe instructions may be sent from the stylus when the computing device is not connected to a network. In this instance, the computing device may fail to receive the instructions and the device will not be wiped. As such, a remote data wipe system configured in accordance with an embodiment of the present invention may include indicators to identify when a requested data wipe has been completed. In one such case, the target computing device can be programmed or otherwise configured to send a signal to the stylus to indicate, for example, when a wipe process has been successfully initiated and when that process has been successfully completed. Lack of such success indicators can be understood by the user to mean that the data wipe was not successfully completed, and that data wipe should be requested again if so desired. The system may include an option of continuously sending the wipe data command (e.g., every hour or half-hour, for instance) so that the instructions will likely be received when the computing device becomes available to the network. In another embodiment, the remote data wipe system may include a target device search module that can be executing, for example, on a search service server or the user's home computer. The search module can be configured to search based on, for example, the MAC address of the target computing device or other suitable ID mechanism. In some example embodiments, the target computing device can be configured to periodically and surreptitiously broadcast a message that the search module is configured to receive. In such cases, as soon as the search module identifies or otherwise recognizes that the target computing device is in communication with the network, the search module can immediately transmit the wipe data instructions to the computing device. In this manner, data can be wiped from a device within seconds of an unauthorized user accessing a network with the device. The computing device may be programmed so that the data wiping function cannot be interrupted once it has started. The wipe data command may be either invisible or visible to the unauthorized user, and an option in the setup menu can provide this choice for the owner if so desired.

In some embodiments, the stylus includes a user interface comprising one or more control features that can be used to activate the data wipe function. Using such control features, a user can input a code that initiates transmission of instructions that results in the target computing device being wiped of data. A 'code' can be, for example, any input from a user that can be uniquely recognized as an instruction to initiate a wipe action on the target computing device. In one specific example embodiment, the control feature is a rotary button switch that the user can turn clockwise and counter-clockwise (like a combination lock, for instance) that can be used to initiate the remote wipe function. However, any suitable control feature can be used, such as a single push-button or slide switch that can be pressed or otherwise engage in a unique sequence to provide a date wipe activation code.

As will be appreciated in light of this disclosure, any wipe-related componentry (e.g., activation mechanism such as rotary or push-button switch, wipe signal generation and transmitter circuitry, and battery) can be contained in a dedicated circuit configured into a relatively small package that can be attached to or otherwise integrated with a stylus or other such portable input device that the user would tend to carry on his/her person (e.g., pocket, book-bag, purse, etc), in accordance with some embodiments. Alternatively, the remote wipe functionality described herein can be implemented in a dedicated data wipe module having a relatively small form factor, such as the size of a memory stick or lipstick or a cigarette lighter or a rectangular/square housing in the range of 2-by-2 square inches or smaller, in accordance with some embodiments. In any such cases, the user can activate the wipe function with relative ease by engaging the activation mechanism that will in turn initiate the wipe function as described herein.

Architecture

Figure 1B:
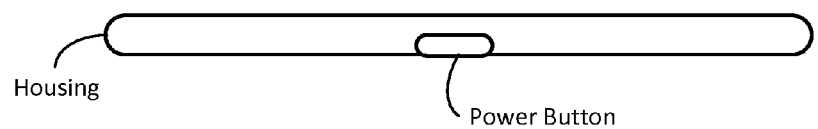
Figure 1C:
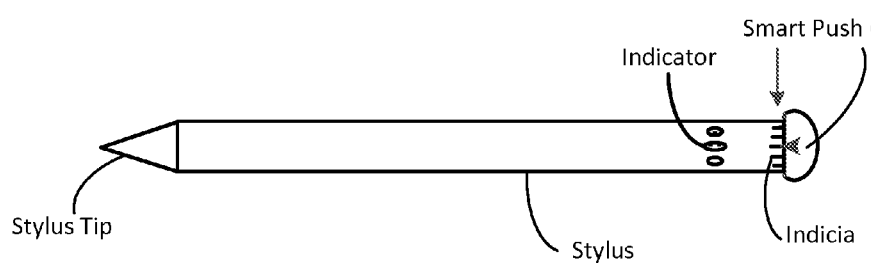
FIG. 1c illustrates an example stylus that can be used with a computing device such as the one shown in FIGS. 1a-b, and is configured in accordance with an embodiment of the present invention.

FIGS. 1a-c illustrate an example electronic computing device and an associated stylus, configured in accordance with an embodiment of the present invention. The computing device can be, for example, a tablet such as the NOOK® tablet or eReader available from Barnes & Noble. In a more general sense, the computing device may be any portable electronic computing device having the capability of displaying content to a user and allowing a user to interact with the device, and that is susceptible to being lost, misplaced, or stolen. Examples devices include, for instance, a mobile phone or mobile computing device such as a laptop, a desktop computing system, a television or smart display screen with user accessible memory. As will be appreciated, the claimed invention is not intended to be limited to any particular kind or type of electronic device.

As can be seen with this example configuration, the computing device can comprise a housing that includes a number of hardware features such as a power button, control features, and a press-button (sometimes called a home button herein). A touch screen based user interface may be provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) touch screen features, or different UI features altogether, depending on the target application of the device. Any such general UI controls and features can be implemented using any suitable conventional or custom technology, as will be appreciated by those skilled in the art.

The hardware control features provided on the device housing in this example embodiment are configured as elongated press-bars and can be used, for example, to page forward (using the top press-bar) or to page backward (using the bottom press-bar), such as might be useful in an eReader application. The same functions can be actuated by pressing or swiping at portions of the touch screen display, and the functions may be user-configurable. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. In some embodiments, the home button can be disabled or otherwise ignored when the remote data wipe function is running, so that the wipe function cannot be interrupted. The home button may further control other functionality if, for example, the user presses and holds the home button. For instance, an example push-and-hold function could include activating a power conservation routine where the device is put to sleep or put into an otherwise lower power consumption mode. So, a user could grab the device by the button, press and keep holding as the device was stowed into a bag or purse. Thus, one physical gesture may safely put the device to sleep. In such an example embodiment, the home button may be associated with and control different and unrelated actions: 1) show the quick navigation menu; 2) exit a configuration sub-menu: and 3) put the device to sleep. As can be further seen in this example embodiment, the status bar may also include a book icon (upper left corner). In some cases, tapping the book icon may provide bibliographic information on the content being consumed by the user or provide the main menu or table of contents for the book, movie, playlist, or other content.

FIG. 1c illustrates an example stylus for use with an electronic computing device configured in accordance with an embodiment of the present invention. As can be seen, the stylus of this example configuration includes a smart push cap, which will be described in turn. In general, the smart push cap can be rotated and/or pushed and released along the axis of the stylus, and each push or rotation action provided by a user can be translated into a corresponding control signal (or a portion of a control signal). As previously explained, other embodiments may include an ordinary push-button or a slide switch, which can also be used. The rotary switch may provide a more intuitive experience for the user, because it has the qualities of a combination lock, in accordance with some embodiments. Thus, the user can have a memorized unique combination code (e.g., 3-clicks left, 1-click right, 2-clicks left) that can be used to issue a data wipe command. In some cases, the combination code may be user-configurable. In other cases, it is hard-coded and comes listed in the supporting documentation of the stylus-based remote data wipe system (which may be provided, for example, along with the computing device, or along with the stylus, or along with a computing device and stylus combination, or as a standalone product). Additional details of the smart push cap will now be discussed with reference to FIGS. 6A and 6B.

Figure 6A:
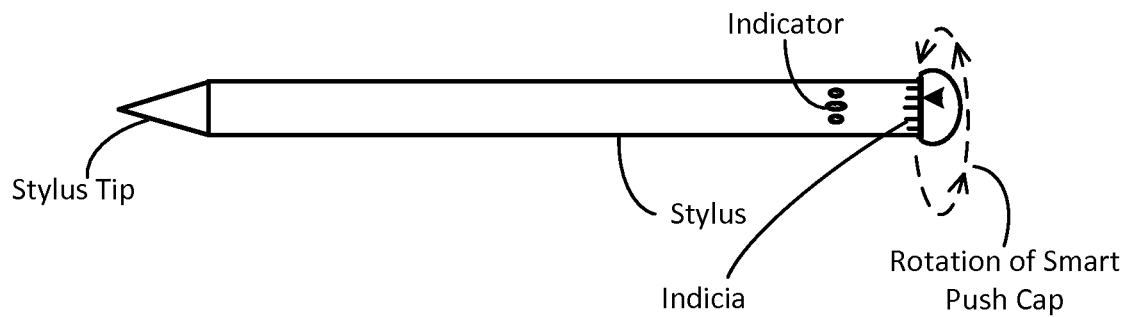
FIGS. 6A and 6B each illustrate an example stylus that can be used to initiate a remote data wipe of an electronic computing device, in accordance with an embodiment of the present invention.

As shown in the example embodiment of FIG. 6A, the smart push cap can be a rotatable push button that can be rotated clockwise and/or counter clockwise to align with indicia on the barrel of the stylus. The indicia may provide visual targets and, in some embodiments, tactile targets, as the smart push cap may provide tactile feedback as it is rotated past a mark (by way of clicking or other tactile sensation). In some embodiments, these tactile targets may be provided by indents in the body of the stylus in combination with a spring loaded ball inside the smart push cap. The spring can provide an inward force that pushes the ball into the indent as the ball reaches the indent during rotation of the cap. This provides a 'stop' that can be felt by the user. Additional rotation force can then be used to push the ball outwardly and compress the spring, allowing the smart push cap to continue rotating to the next indicia (indent). In this manner, the remote wipe code can be input visually and/or tactilely, and if the smart push cap is rotated to the proper points on the barrel of the stylus, in the proper order as detected by circuitry within the stylus, the wipe data instruction is initiated and sent to the network. Instructions for completing other functions unrelated to wiping data may also be programmed into the smart push cap input device, if so desired.

Figure 6B:
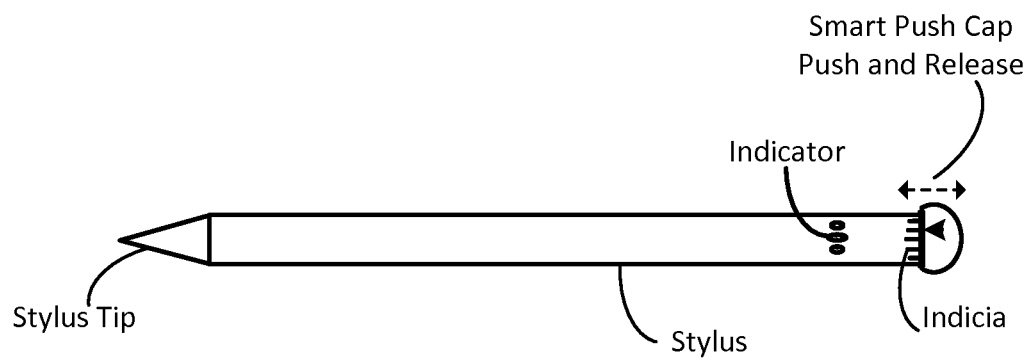
Figure 7:
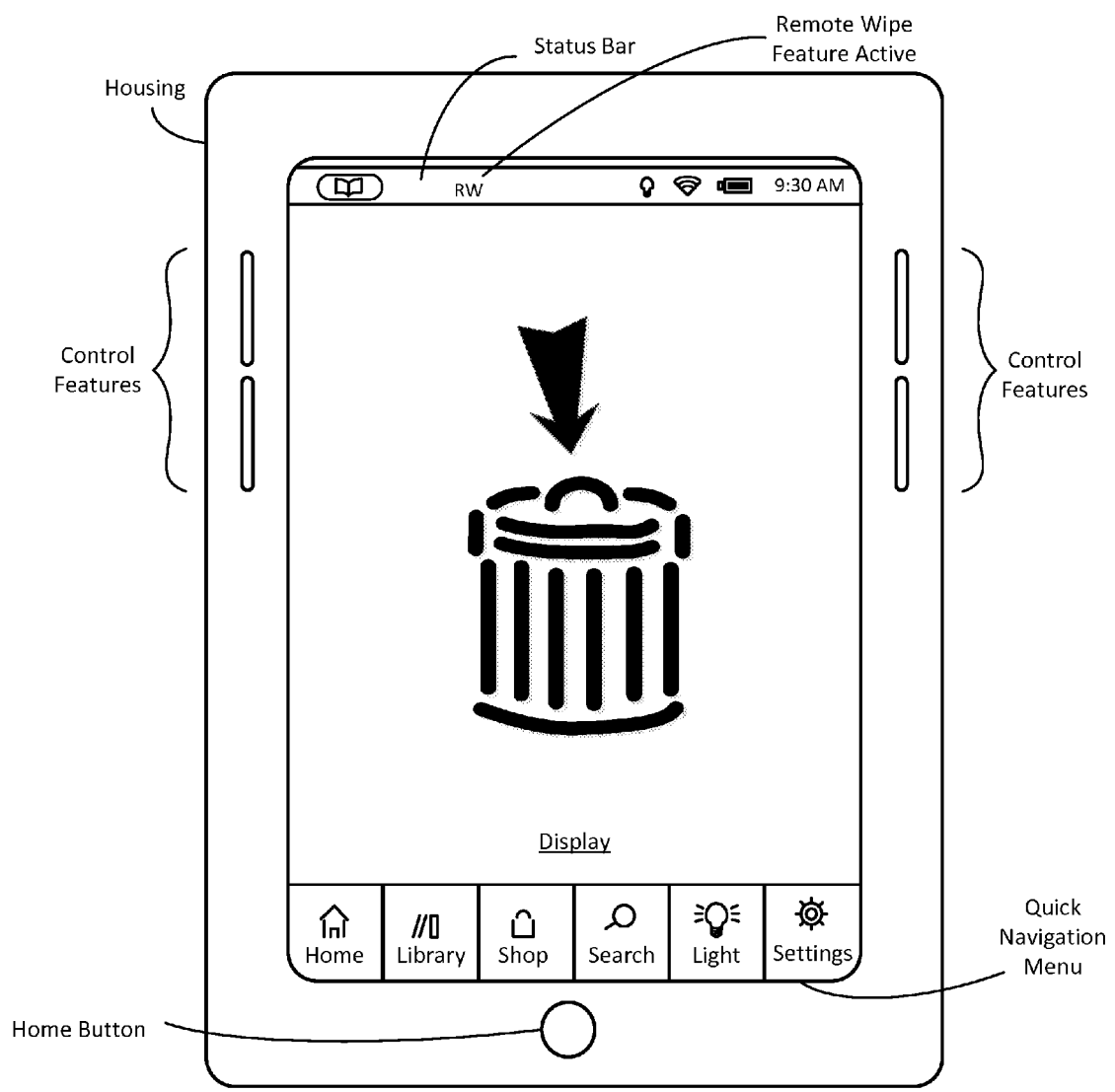
FIG. 7 provides an example screen shot that can be displayed on an electronic computing device as data is being wiped from the device in response to a stylus-based command signal, in accordance with an embodiment of the present invention.

In another example embodiment shown in FIG. 6B, a smart push cap may be slidably mounted at one end of a stylus, may be retractable, and can be pushed and allowed to retract in a specific sequence to initiate a wipe data command. This push and release process may be similar or identical to the action of a retractable ball point pen, for example, except that the smart push cap is used to generate a control signal rather than to extend a ballpoint. A sequence may include, for example, long button holds and short button holds. In one example, a series for initiating a remote data wipe function may involve pressing and holding the smart push cap in a compressed position and might include, for instance, three short holds followed by three long holds followed by three short holds.

In another example embodiment, the proper series of rotations of the rotary cap may be indicated by one or more lights. For example, the user may rotate the cap clockwise until a blue light is illuminated, counterclockwise until a blue light is illuminated again, clockwise until a red light is illuminated and finally counterclockwise until a green light is illuminated. If the proper sequence is achieved, the remote wipe instructions can be sent. The process may include one or more intervening lights of different colors to obfuscate the proper combination. In a related embodiment, a rotary cap may be rotated in a single direction with a required pause when each correct light is illuminated. In another embodiment, the rotary cap may be pressed inwardly when a proper light is illuminated.

In another example embodiment, the stylus may include a sliding mechanical switch. The switch may be biased to a central position and may be slid by the user to an up or down position to register a contact or parameter change (e.g., capacitive, resistive, etc) that can be detected by the circuitry in the stylus. A code may be input into the stylus using the sliding switch. For example, a code to initiate the wipe instructions may be one slide up, two slides down, two slides up and one slide down. In a similar embodiment, the input device may be a rocker switch or two (or more) separate switches on the barrel of the stylus. The proper code can be entered by pressing the two switches (or two ends of the rocker switch) in a specific sequence of pushes, such as lower switch, upper switch, three lower switch, one upper switch and two lower switch. In another example embodiment, a code may be input by a series of clicks of a push cap. For instance, the instructions may be initiated by a specific series of pushes such as two clicks followed by a pause, then one click followed by a pause, and then four more clicks followed by a pause.

In another example embodiment, an alpha or numeric code may be entered into a display, an LED digital screen for instance, by, for example, rotating a cap, pushing and releasing a cap, pushing one or more switches, or via voice command. For instance, the first digit in the display may advance from 0 to 9 as a smart cap is rotated in a single direction. When the direction of rotation is reversed, the display stops advancing the first digit and writes the currently displayed number as the first digit in the display. As the cap is rotated in the opposite direction, the second digit advances until the desired digit is seen in the display. Upon reversal of direction again, the stylus writes the displayed number to the second digit of the display. This process may continue for any number of digit columns until the proper code to initiate instructions is provided. The same procedure may be used to advance through the alphabet for a code based on a word or series of letters. A stylus with sound recognition capability can initiate instructions in response to a specific word or phrase, such as 'wipe data' or the like. Although the stylus can include voice recognition capability, in some embodiments the stylus does not need to have sophisticated voice recognition ability, but can be trained to simply recognize one or two words or phrases in order to be functional.

In other embodiments, the remote wipe initiation signal may be sound (e.g., via a stylus microphone that detects a voice command or an acoustic vibration sensor that detects taps on the stylus housing). In any such cases, the electrical signals generated by the push cap switching, microphone, acoustic vibration sensor, or any other switching or transducer mechanism can be received by a processor within the stylus that is configured to interpret such signals and to initiate the remote data wipe function when appropriate. Note that the processor may be optional in embodiments where the control feature is coupled directly to a memory configured to output its contents in response to an input signal. For instance, in one such embodiment, a look-up table can be provided in the stylus that is configured to receive a control signal from the smart push cap (or other control feature) and to automatically output a corresponding digital code to the transceiver, which can then transmit that code to the target computing device via the network. Numerous such configurations will be apparent in light of this disclosure. As previously explained, the specific sequence to initiate a set of instructions using the smart push cap may be chosen by the user during the setup process, or hard-coded.

With further reference to FIG. 1c, the stylus may include an output device to provide or relay information to the user. In this particular example embodiment, the output device is designated as an indicator and may be, for example, visual, tactile or audible, and can include, in some specific embodiments, one or more of lights, digital readouts, displays, sound transducers and/or vibration devices. In some embodiments, the indicator(s) may indicate, for example, a particular status or that instructions have been sent or received. For example, one or more lights on the stylus may illuminate or blink when instructions to wipe data from a target computing device have been successfully entered into the stylus. In a further embodiment, lights on a stylus may illuminate or blink in response to data being successfully wiped from the associated computing device. Other events that may trigger specific outputs on a stylus include, for example, successful initiation of the data wipe procedure, failure to contact the computing device, an attempt to re-contact the computing device, information regarding the location of the computing device, indication that the computing device is or isn't on a network, or an indication that the wipe data instructions have been properly configured. Numerous such statuses can be communicated via the stylus indicators.

Figure 2A:
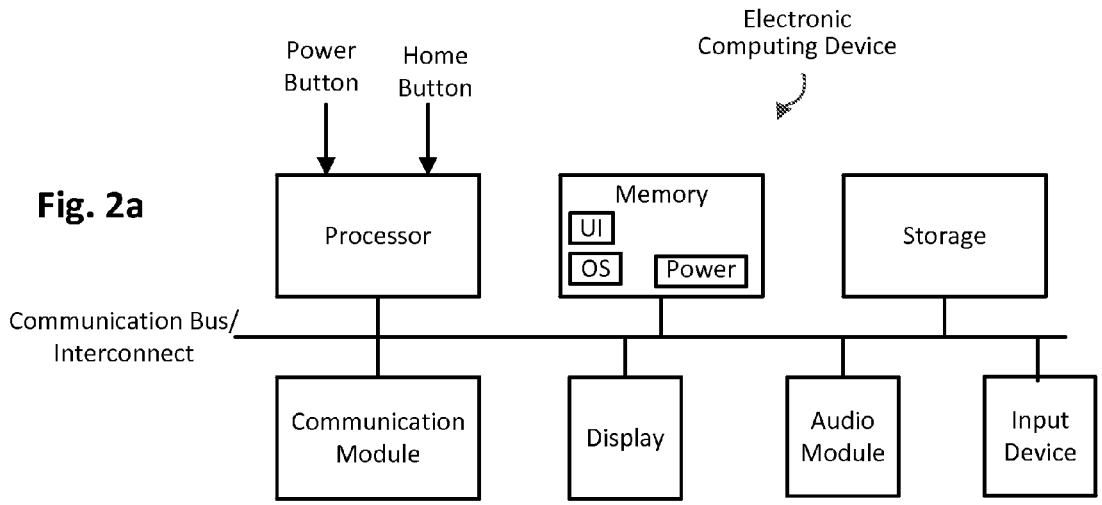
FIG. 2a illustrates a block diagram of an electronic computing device configured in accordance with an embodiment of the present invention.

FIG. 2a illustrates a block diagram of an electronic computing device configured in accordance with an embodiment of the present invention. As can be seen, this example device includes a processor, memory (e.g., RAM and/or ROM for processor workspace and storage), additional storage/memory (e.g., for content), a communications module, a display, an audio module, and an input device (e.g., touch screen, trackpad, etc). A communications bus and interconnect is also provided to allow inter-module communication. Other typical componentry and functionality not reflected in the block diagram will be apparent (e.g., battery, co-processor, etc). Although a touch screen display may be used in some cases, other embodiments may include a non-touch screen and a touch sensitive surface such as a track pad, or a touch sensitive housing configured with one or more acoustic sensors, etc. In any such cases, the touch sensitive surface is generally capable of translating a user's physical or proximate contact with the surface into an electronic signal that can be manipulated or otherwise used to trigger a specific functionality, such as that provided herein. The principles provided herein equally apply to touch sensitive devices as well as to devices using other UI's such as keyboards, virtual keyboards, track pads, mice and voice commands. For ease of description, examples are provided using a touch screen computing device.

In this example embodiment, the computing device's memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a remote data wipe function as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touch screen, an LCD or LED display, or any other suitable display and touch screen interface technology. The communications module can be configured to execute, for instance, any suitable protocol which allows for connection to the stylus so that information can be downloaded to the stylus from the device and/or to the device from the stylus. Example communications modules may include an NFC (near field connection), Bluetooth, 802.11 b/g/n WLAN, or other suitable chip or chip set that allows for wireless connection to the stylus (including any custom or proprietary protocols). As previously explained, a wired or wireless connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications. In some embodiments, the stylus may be sized appropriately for the computing device with which it is paired.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented using any such platforms. The power management (Power) module can be configured, for example, to automatically transition the device to a low power consumption or sleep mode after a period of non-use. A wake-up from that sleep mode can be achieved, for example, by a physical button press and/or a touch screen swipe or other action. The user interface (UI) module can be, for example, based on a keypad or touch screen technology and the various example screen shots shown in FIGS. 1a, 4, and 7-9 in conjunction with the stylus-based remote data wipe methodologies demonstrated in FIGS. 3 and 5, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc. The input device can be, for example, a keyboard (real, or virtual in conjunction with touch screen display), trackpad, mouse, and/or other such commonly used input device.

Figure 2B:
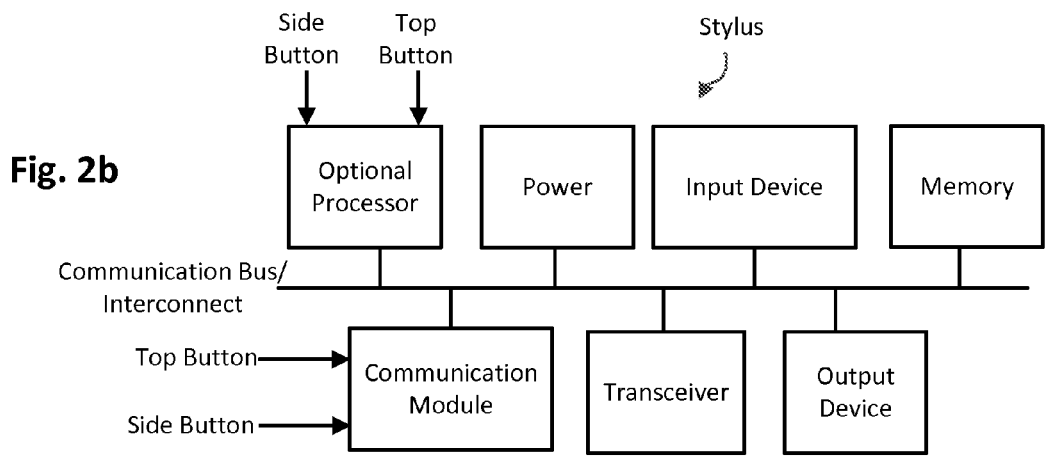
FIG. 2b illustrates a block diagram of a stylus configured in accordance with an embodiment of the present invention.

FIG. 2b illustrates a block diagram of a stylus configured in accordance with an embodiment of the present invention. As can be seen, this example stylus includes an input device, an output device, memory and a communications module. A communications bus and interconnect may be provided to allow inter-module communication. A power module is also provided, such as a battery. An optional processor may also be included in the stylus to provide local intelligence, but such is not necessary in embodiments where the computing device with which the stylus is associated provides any needed requisite control and direction, and/or when control signals from the stylus input device can be applied directly to a push-based memory (e.g., look-up table) or other such arrangement that eliminates the need for an intervening processor to execute the desired stylus-based functionalities. The optional processor can be any suitable processor and may be programmed or otherwise configured to recognize the stylus and may receive input from the input device which in this example case includes top and side buttons (one of which may be a push-button or smart push cap as previously discussed) and may provide output via the output device (e.g., one or more LEDs or a display). The storage may be implemented with any suitable memory and size (e.g., 2 to 4 GBytes of flash memory). Other componentry and functionality not reflected in the block diagram (e.g., microphone, speaker, antenna, etc) will be apparent.

The communications module can be, for instance, any suitable module that allows for connection to a nearby computing device and/or to a network to reach a remote computing device, so that instructions can be transferred to the target computing device from the stylus. Example connection modules may include an NFC, Bluetooth, 802.11 b/g/n WLAN, or other suitable chip or chip set. Wired connectivity can be achieved, in some embodiments, by USB, Ethernet, IEEE 1394 and fibre channel. In this example case, the communications module can receive input from the user from control features including top and side buttons, wherein such inputs can be used to enable the transmit function of the communications module. In one such embodiment, when a unique combination code associated with initiating the stylus-based remote data wipe function is received by the communication module, that communication module will then automatically transmit the data wipe instructions (commands) to the network so that it will be communicated to the remote target computing device. In some embodiments, the computing device can recognize the stylus via a communication link (e.g., based on discovery protocols and/or embedded ID data or other suitable identifiers).

As previously explained, the communications module can be used to allow the stylus to communicate directly with the target computing device (when the two are in close proximity or otherwise local to one another) or to a network thereby allowing for remote communications to the target computing device. In some embodiments, two distinct communication modules can be used for these respective tasks (local and remote communications). For instance, in some embodiments, the stylus may access the Internet via a wireless or wired connection to a local area network that is in turn connected to the Internet (e.g., wireless access point or router). In another embodiment, the stylus can be configured to send instructions to a remote computing device via a cellular telephone network using a cellular communication module. In any such embodiments, the target computing device may also be configured to communicate with the stylus in a same or similar manner.

Figure 2C:
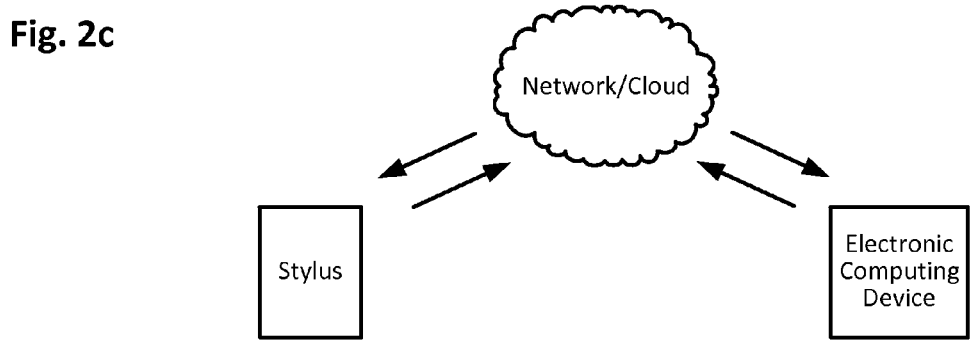
FIG. 2c illustrates a block diagram of a communication system that can be configured to carryout remote data wipe, in accordance with an embodiment of the present invention.

Thus, the stylus can include a transmitter for send data wipe command, or a transceiver for sending data wipe command and receiving feedback from the target computing device, and in some embodiments, is configured to send and receive commands/messages via cellular networks, local area networks, wide area networks (including the Internet), and/or any combination thereof. FIG. 2c illustrates a block diagram of one example communication system that can be configured to carryout remote data wipe, in accordance with an embodiment of the present invention. As can be seen, this system involves the stylus communicating with a target computing device via a network/cloud that includes a local and/or wide area network. In other embodiments, note that the communication system may not require the use of a server or other processor as an intermediary between the stylus and the computing device. In one specific embodiment, instructions such as data wipe instructions can be sent to a computing device using a text messaging protocol such as SMS, or similar. Upon receipt of the message, the computing device may recognize an ID uniquely associated with the stylus, thus indicating that the stylus is authorized. A specific SMS message may correspond to a wipe data command and will initiate the data wipe on the target computing device.

Configuring Stylus-Based Remote Date Wipe

As previously explained, a stylus may be pre-set by the manufacturer, or another party, with a particular input code for sending instructions to wipe data on the associated computing device. A pre-set code may be particularly useful in applications, for example, where the stylus and computing device do not directly communicate with each other. For instance, in some such embodiments, a third device with which the stylus can communicate, such as a server, can identify the specific stylus sending the wipe instructions, verify the instructions, and match that specific stylus to its associated computing device. The server can then send the data wipe instructions to the identified computing device. In other such cases using a pre-set code, the stylus and target computing device may be paired with each other at the factory or after a discovery/pairing session, and therefore allow for direct communication as well as remote communication without needing any configuration. In other embodiments, the remote data wipe system may provide for a degree of user configurability and/or allow for discovery and pairing using established or otherwise available communication protocols. In some such example cases, the user may be able to choose the code used to initiate instructions for data wiping, as will now be discussed with reference to FIG. 3.

Figure 3:
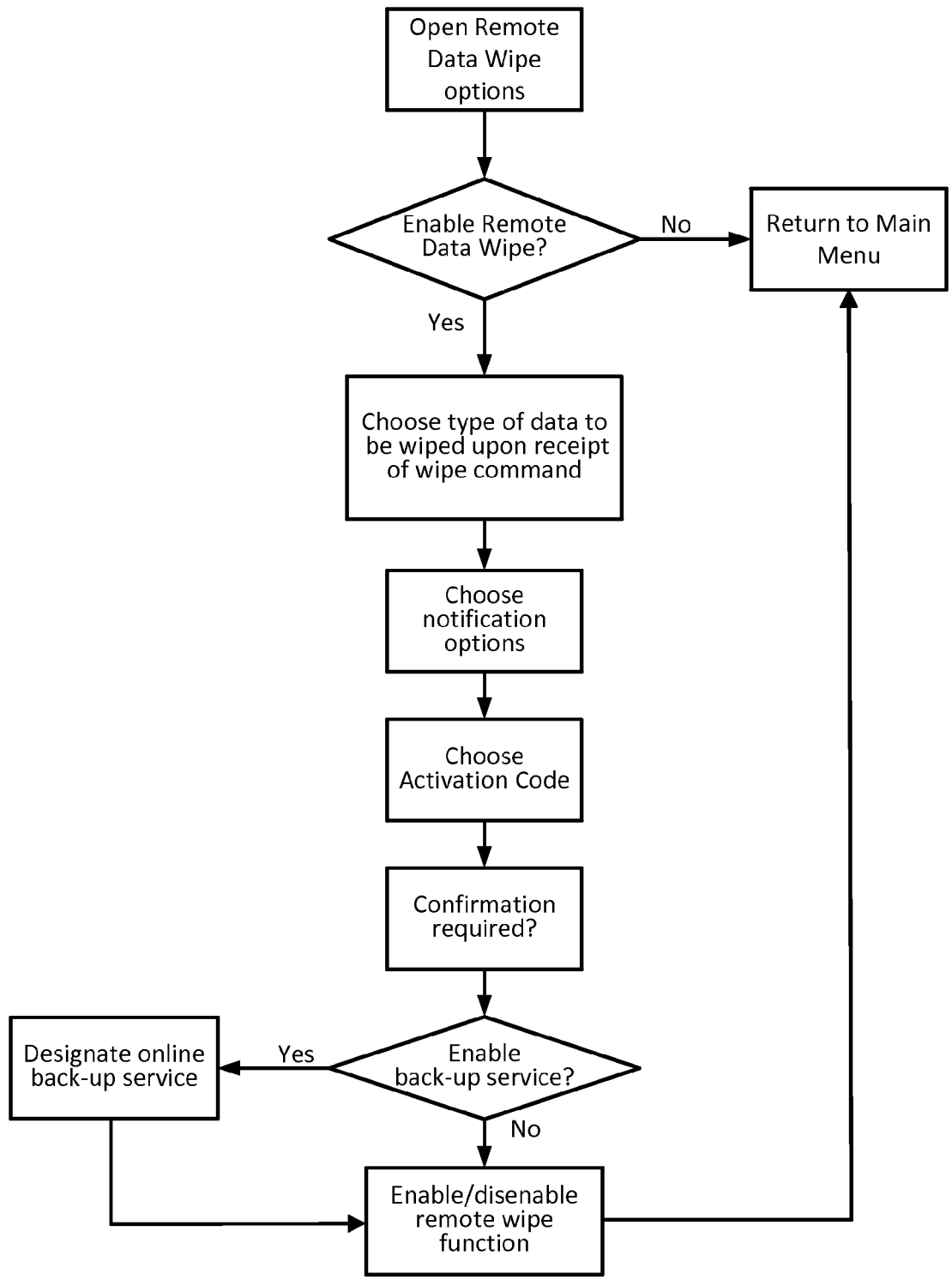
FIG. 3 is a flow chart illustrating a process for configuring a stylus-based remote wipe function in accordance with an embodiment of the present invention.
Figure 4:
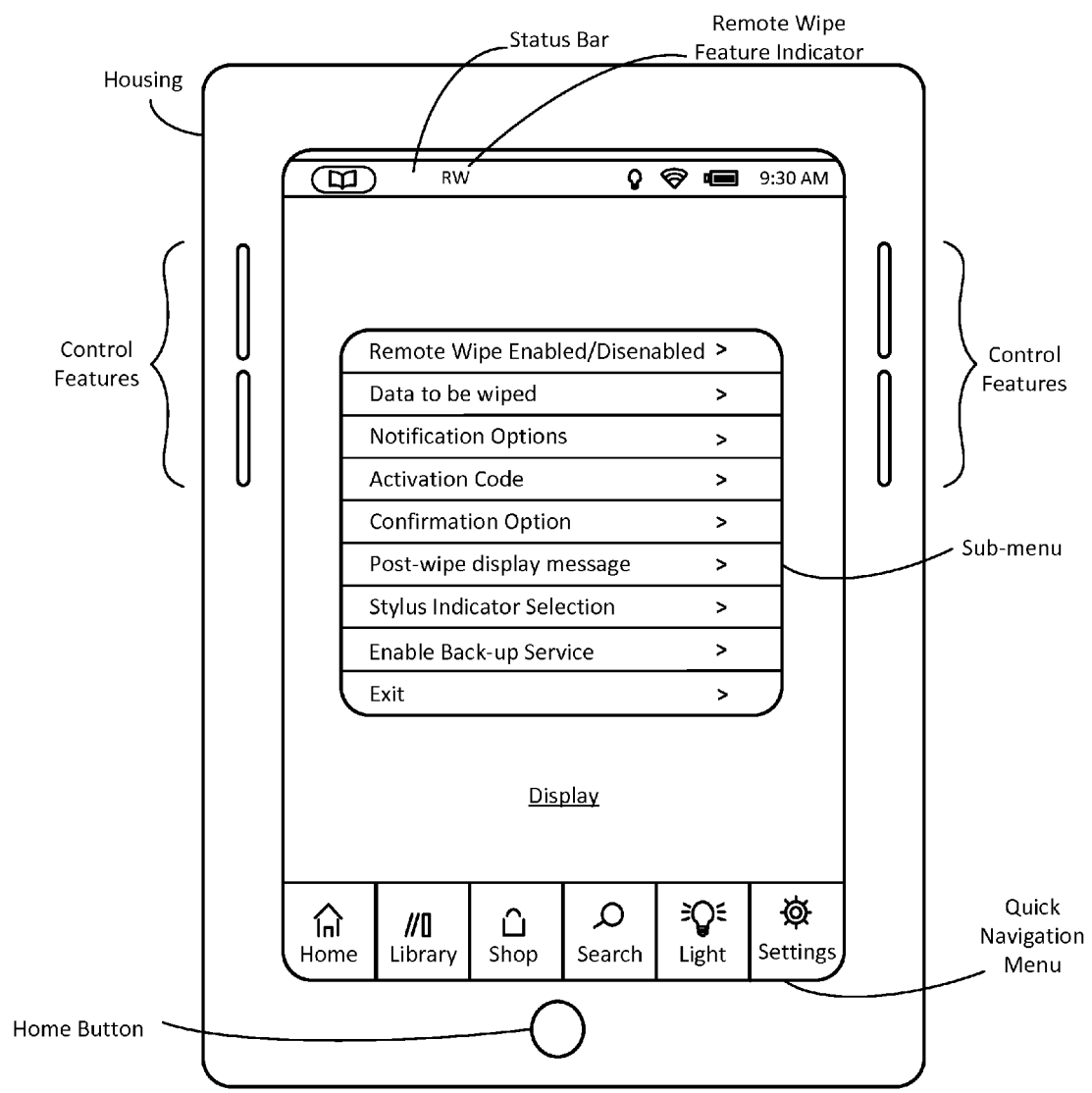
FIG. 4 illustrates an example configuration screen shot of the user interface of an electronic computing device configured in accordance with an embodiment of the present invention.

FIG. 3 illustrates a flowchart illustrating one example embodiment where the user can prepare a stylus for remote data deletion. As shown, the process may be started by opening a submenu on the computing device (e.g., submenu is designated Remote Data Wipe Options is this example case). The submenu generally provides the user a number of options, and these options may be presented in parallel, on a single menu with multiple choices, or sequentially where the user makes selections that advance the menu from one choice to the next, as shown in the example of FIG. 3. FIG. 4 illustrates an example configuration screen shot of the user interface of an electronic computing device configured in accordance with an embodiment of the present invention. As will be appreciated, this example configuration screen and its corresponding sub-menus can be used in conjunction with the method of FIG. 3, in accordance with some embodiments.

As can be further seen, in the first step after opening the submenu, the user is provided with the option of enabling the remote data wipe function, and the user may choose either to enable the remote data wipe function or to leave it disabled. Other embodiments may have the remote data wipe function always enabled. If the user chooses no, then the user is returned to the main menu. If the user chooses yes, the configuration process continues with allowing the user to choose the specific type and amount of data that is to be wiped when a remote wipe command is received. One specific sub-option is to wipe all data and programs from the computing device to leave only the operating system. Other options may include wiping all stored data while retaining programs. Additional options may include wiping personal information, such as contacts; wiping specific file types such as any one or more of documents, spreadsheets, emails, photos, videos and browsing history; and/or wiping individual files or groups of files selected by the user. Another option may include instructions to re-write over the device memory to assure that wiped files cannot be recovered from the device.

With further reference to the example embodiment of FIG. 3, the configuration process continues with allowing the user to choose the specific options for notification. Types of notification can include, for example, information regarding whether or not a computing device has been wiped, whether or not a computing device is connected to a network, and the location of the computing device. Example methods of notification include email to one or more chosen email addresses, text to a mobile phone, or notification to a stylus that in turn can notify the user via an integral stylus output device. For example, notification may be transmitted to the user by activating one or more indicators on a stylus as shown in FIG. 1c, such as a multi-color LED. For instance, a blinking purple (or other suitable color) LED can be used to confirm to the user that the action being selected is for wiping the associated computing device. In some such cases, the user can click the pen cap in response to the purple blinking LED to confirm. The LED may then blink red to indicate that remote wipe of the target computing device is in process. The LED may then blink yellow for a brief period (e.g., 10 seconds) to confirm to the user the remote wipe has been successfully completed. Numerous other color code schemes can be used (e.g., blinking red LED may indicate that the computing device cannot be connected, and a sequential blinking of yellow LED may indicate that a wipe data command has been successfully sent to the network and received by the computing device, etc). In some embodiments, notification may include a photo and/or audio sample taken by the device and subsequently transmitted to the user or to a third party. Photo, video or audio sampling by the target computing device can be activated by receipt of the wipe data command and the target computing device may be programmed or otherwise configured to sample, for example, upon start up, upon completion of data wiping, or upon commencement of any user interface activity, such as input of data via a touch screen or keyboard or when sound and/or motion is detected by the target computing device. A specific code may be programmed into the stylus to launch this additional functionality. In this manner, a photo may be taken and immediately transmitted after activation of the computing device by an unsuspecting unauthorized party. Additional notifications may be indicated on the computing device itself. For instance, after a data wipe, a message can be displayed on the device. The message may relay information from the user or may be pre-programmed into the computing device, for example, when the data wipe function is initially set up by the user. The target computing device may display messages to indicate that the device has been disabled, or rendered unusable, or any other message that might encourage its return to its rightful owner.

With further reference to FIG. 3, the configuration process continues with allowing the user to select a specific activation code for activating the remote wipe command from the stylus. Activation codes may be available, for example, from a pull down menu on the computing device or unique activation codes may be entered into the computing device by the user. In one specific example embodiment, the computing device may request that the user input the desired remote data wipe code into the stylus while a code listening module executing on the computing device automatically monitors and detects the code entered by the user. The computing device thus receives the code that is input by the user and can store it as the proper activation code until changed by an authorized user. With reference to the example stylus illustrated in FIG. 1c, an example code might be, for instance, rotating the smart push cap two clicks right, four clicks left and then one click right before pressing the top down. By pressing the top down, or some other specific finalization step, the stylus can store the code and/or transmit the code to the target computing device to be written to memory. The computing device can indicate that an acceptable code has been received and recorded. In other embodiments, the data wipe code may be pre-set and provided by the manufacturer to the user with the stylus. In this manner, if a user forgets a specific code, the user can contact the manufacturer, provide authenticating information, and receive the code from the manufacturer. In some cases, two or more codes are capable of sending the data wipe command to the computing device. For instance, one code may be retained by the manufacturer and one may be provided by the user. In this embodiment, two or more codes may be capable of activating the data wipe instructions. In other embodiments, the code can be selected randomly and in a manner that is transparent to the user, and then stored in both the stylus and target computing device, so that the user does not have to remember any specific code. Rather, the user can engage the remote data wipe function by processing a specific stylus button or otherwise activating a given control feature which in turn causes the randomly selected code to be sent.

With further reference to FIG. 3, after a code has been chosen, the configuration process continues with the user deciding whether or not a confirmation step will be required for the stylus to transmit the data wipe command. If a confirmation step is requested, the data wipe instructions will not be transmitted until the confirmation step is executed by the user. An example of a confirmation step is, for example, holding the smart push cap of the stylus down for an extended period of time, e.g., five seconds. The use of a confirmation step may help to eliminate inadvertent sending of data wipe instructions.

With further reference to FIG. 3, the configuration process continues with the user deciding whether or not to perform a back-up prior to the remote data wipe process being carried out. If so, the user can designate an online back-up service and the corresponding back-up application will be automatically launched so as to back-up all desired files while the lost/misplaced/stolen target device remains, for example, in a locked screen or other such secure mode. The configuration process then continues with enabling the remote wipe function as variously configured by the user. In some embodiments, such as the example shown in FIG. 4, an icon or other indicator such as "RW" may be displayed on the computing device (e.g., on status bar) to indicate to the user whether or not the remote wipe feature is enabled, so as to provide a degree of visibility for the protection being provided by the remote data wipe functionality.

Initiating Stylus-Based Remote Date Wipe

Figure 5:
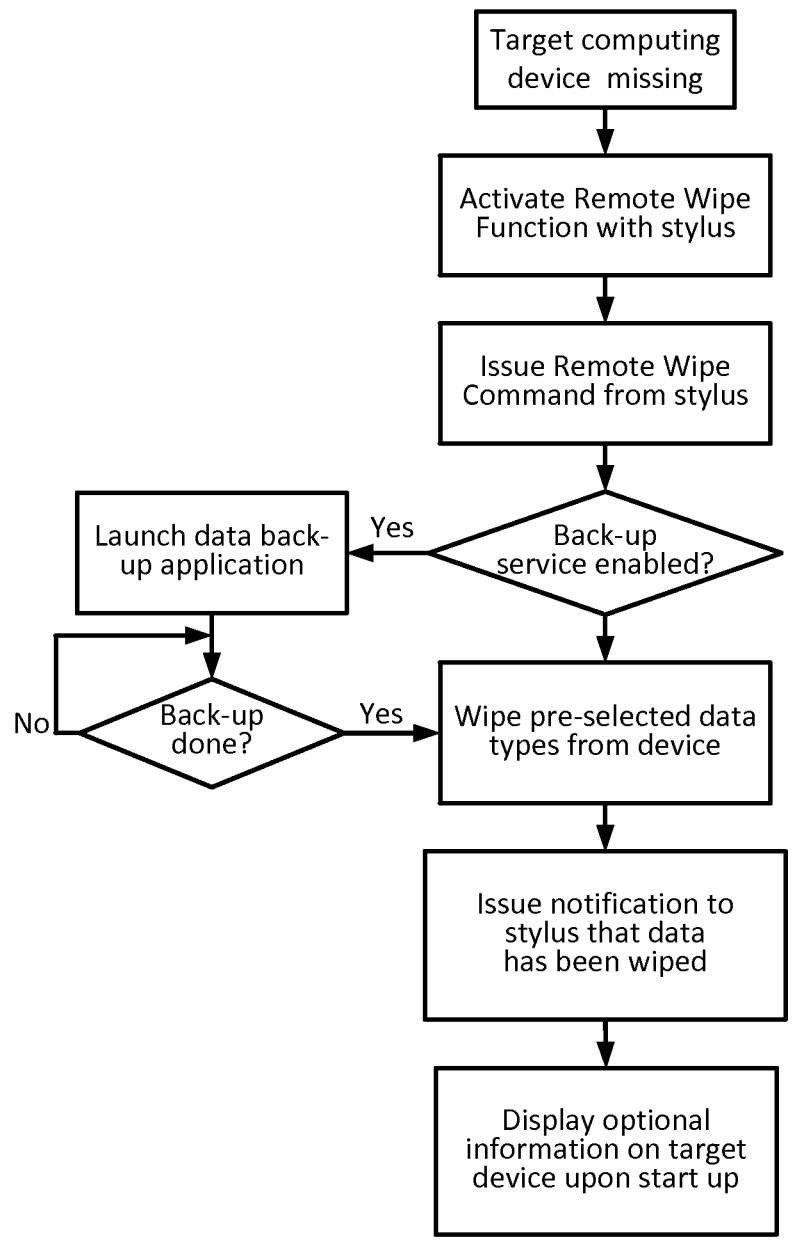
FIG. 5 is a flow chart illustrating a stylus-based remote wipe function for wiping of data from an electronic computing device, in accordance with an embodiment of the present invention.

When a computing device is lost, misplaced, or stolen, the user may initiate a data wipe function using only, in some embodiments, a stylus or dedicated remote data wipe module specifically configured to initiate such a function. FIG. 5 is a flow chart illustrating a stylus-based remote wipe process for wiping of data from an electronic computing device, in accordance with an embodiment of the present invention. The stylus may be kept separate from the computing device and can easily be kept in a pocket or desk drawer or purse or book-bag, for example.

When a decision has been made to wipe the data from a computing device because the target computing device is missing), the user can activate the data wipe function by entering the proper code into the stylus or otherwise causing the function to be initiated (e.g., button-press). As previously explained, the code can be selected by the user or otherwise provided in advance, and is therefore known by the stylus and the target computing device. Note, however, that the user does not always need to know the code, in some embodiments. In some example embodiments, upon proper entry of the code (and the confirmation step, if required) the stylus can provide an indication, such as green flashing LEDs, that the code has been properly entered. Other embodiments may not have such an indication and may be activated by a button-press or other simplistic action.

The process then continues with the stylus issuing the remote data wipe command to a network. The command may be, for example, packet-based and include all information needed to travel the given network in search of the target computing device. Numerous such ID-based communication technologies can be used. In some embodiments, there may be in intervening processor or service that interprets the command, identifies the stylus, and seeks out the associated target computing device. In any such cases, if the target computing device is found on the network, for example if the device's MAC address is recognized, the remote data wipe command is forwarded or otherwise provided to that target device.

In some embodiments, the computing device can immediately start wiping data that was specified previously, in response to receiving the remote data wipe command. However, in the example embodiment shown in FIG. 5, the process includes determining if a back-up service is enabled. If not, then the remote data wipe command is executed. If, on the other hand, a back-up service is enabled, then the process includes launching the designated data back-up application. Any suitable back-up service can be used (e.g., Carbonite, etc) or other such online back-up service. Once the back-up has completed, the process may then continue with executing the remote data wipe command. The computing device may also report back other helpful information, such as location information, audio/video, keylogger data, etc to a designated server or computer associated with the rightful owner of the target device, so that information can be stored or forwarded to the user for evaluation in the effort to recover the missing computing device.

The method may further include issuing, by the target computing device, notification to the stylus that the instructions have been received and/or executed by the target device and can notify the user of this by, for example, a specific sequence of flashing light(s) as previously explained. During the data wiping time period, the stylus may provide an additional notification, such as blinking yellow light(s) to indicate that the wipe is in process. In some embodiments, after the specified data has been wiped from the device, the device can send a message (e.g., email, text, etc) indicating that the wipe has been completed.

Figure 8:
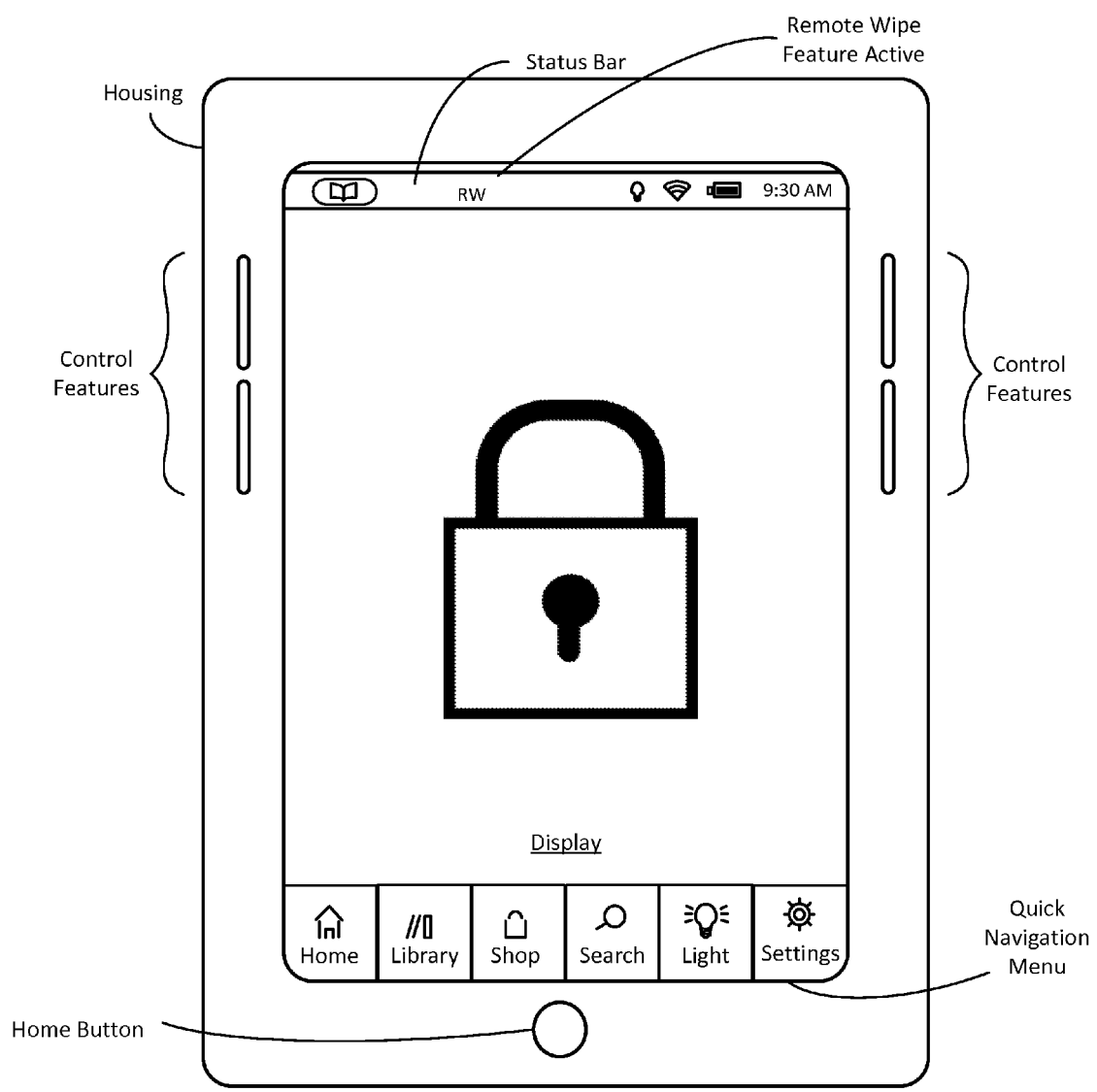
FIG. 8 provides an example screen shot that can be displayed on an electronic computing device after the computing device has been remotely wiped, in accordance with an embodiment of the present invention.
Figure 9:
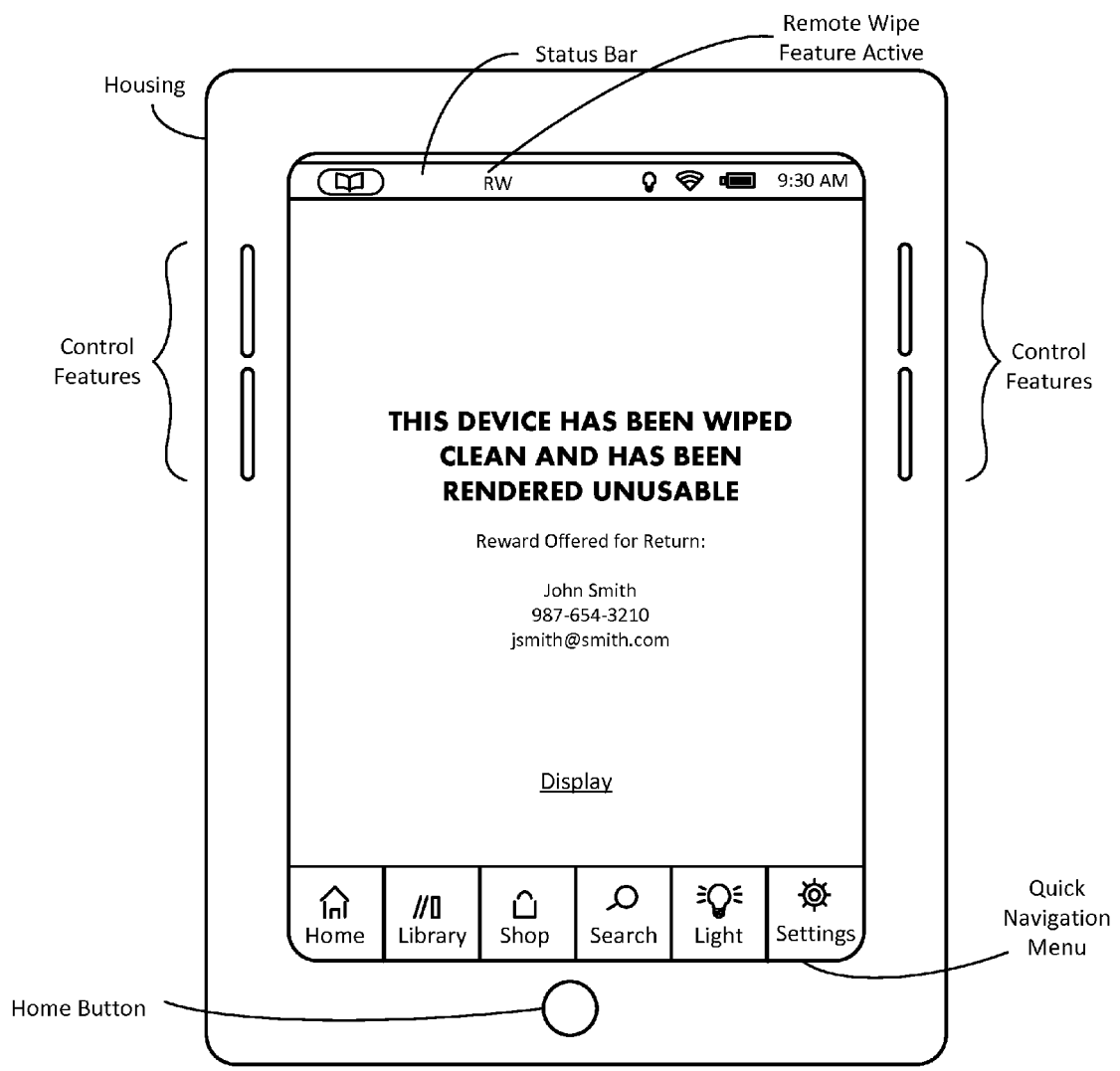
FIG. 9 provides an example screen shot that can be displayed on an electronic computing device after the computing device has been remotely wiped, in accordance with another embodiment of the present invention.

As can be further seen with reference to FIG. 5, the method may further include displaying, by the target computing device, one or more messages intended to be read by the party that may have possession of the target computing device. In some embodiments, for example, a graphical type message such as that shown in FIG. 7 can be displayed during the wipe function to indicate that any useful data is being deleted. In other embodiments, no indication of the wipe process is provided, thus allowing the data deletion process to proceed in a surreptitious manner. FIG. 8 provides an example of a screen shot that might appear after a computing device has been remotely wiped and has become inaccessible. FIG. 9 provides an example of a screen shot from a device that includes information meant to be read by an unauthorized party. The information provided may include contact information, reward information or a warning regarding unauthorized use. Display messages may also include, for example, an indication that all data has been wiped from the device and that it is inoperable by the unauthorized party, or any other such messages that might encourage its return to its rightful owner.

Numerous variations and embodiments will be apparent in light of this disclosure. One example embodiment of the present invention provides a computing device including a touch sensitive surface for allowing user input via direct or proximate contact with a stylus, and a user interface. In this example embodiment, the user interface includes a remote data wipe function that is configured to wipe data from the computing device in response to a specific stylus action. In some cases, the touch sensitive surface is a touch screen display. In some cases, the computing device includes a stylus configured to communicate with a network and including an input control feature. In some such cases including a stylus, the input control feature comprises a rotatable button that can be engaged to activate the remote data wipe function. In some such cases including a stylus, the input control feature comprises a button that can be pressed and released to activate the remote data wipe function. In some such cases including a stylus, the stylus comprises one or more indicators. In some such cases including one or more indicators, the one or more indicators comprises a light, a display, a speaker, and/or a vibrating element. In some such cases wherein the one or more indicators comprises a light, the light comprises a light emitting diode. In some cases, the remote data wipe function is activated by inputting a code into a stylus that is communicatively paired with the computing device. In some such cases, at least one of the code and/or the type of data to be wiped is user-configurable. In some cases, the remote data wipe function is further configured to launch a data back-up application prior to wiping data from the computing device.

Another example embodiment of the present invention provides a method for interacting with a remote target computing device. In this example embodiment, the method includes receiving (via a communication network) a wipe data command at the remote target computing device (the wipe data command issued from a stylus), and wiping data from the remote target computing device in response to the wipe data command. In some cases, the method includes displaying a message on the remote target computing device after data has been wiped from the device, and/or indicating to a user via an output device on the stylus that the wipe data command has been initiated, that the data wiping is under way, and/or that the data wipe has been completed. In some cases, a back-up application configured to remotely back-up data of the remote target computing device before that data is wiped from the device is launched, prior to wiping data from the remote target computing device.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive (via a communication network) a wipe data command at the remote target computing device (the wipe data command issued from a stylus), and wipe data from the remote target computing device in response to the wipe data command. In some cases, the process is configured to display a message on the remote target computing device after data has been wiped from the device, and/or indicate to a user via an output device on the stylus that the wipe data command has been initiated, that the data wiping is under way, and/or that the data wipe has been completed. In some cases, the process is configured to launch a back-up application configured to remotely back-up data of the remote target computing device before that data is wiped from the device, prior to wiping data from the remote target computing device.

The foregoing description of the embodiments of the invention has been presented for the purposes of illustration and description. It is not intended to be exhaustive or to limit the invention to the precise form disclosed. Many modifications and variations are possible in light of this disclosure. For example, in another embodiment, a given computing device may be configured to initiate a data wipe function on a lost, stolen or misplaced stylus. This reverse functionality could be implemented in a similar fashion as described herein, as will be appreciated. It is intended that the scope of the invention be limited not by this detailed description, but rather by the claims appended hereto.

What is claimed is:

1. A stylus configured to communicatively pair with a computing device that is out of control of a user through loss or theft, the stylus comprising:
   a tip at a first end of the stylus;
   an input control feature at a second end of the stylus opposite the first end, the input control feature configured to receive a user action;
   a processor disposed within the stylus that, responsive to the received user action, causes transmission of an instruction to the computing device to execute a remote data wipe function that is initiated by the computing device within a first period of time following receipt of the instruction, the remote data wipe function configured to render all data stored in the lost or stolen computing device irretrievably unavailable in response to of the instruction from the communicatively paired stylus, the remote data wipe function rendering all data stored in the lost or stolen computing device irretrievably inaccessible prior to physical recovery of the computing device and restoration of a backup version of the data previously stored on the computing device, the processor further configured to receive a corresponding confirmation of completion of the data wipe from the computing device; and one or more indicators operatively coupled to the processor and configured to indicate one or more statuses of execution of the remote data wipe function, the statuses including a completed status that manifests in response to the processor indicating receipt of the confirmation of completion.

2. The stylus of claim 1, wherein the computing device includes a touch screen display.

3. The stylus of claim 1, wherein the stylus is configured to transmit the instruction via a communication network.

4. The stylus of claim 1, wherein the input control feature comprises a rotatable button configured to turn clockwise and counter-clockwise about a longitudinal axis of the stylus, and wherein the user action for instructing the computing device to execute the remote data wipe function is a preset sequence of turns of the rotatable button, the preset sequence including at least one of a clockwise turn and a counter-clockwise turn.

5. The stylus of claim 1, wherein the input control feature comprises a button that can be pressed and released to activate the remote data wipe function.

6. The stylus of claim 1, wherein the one or more statuses of execution of the remote data wipe function further include a failed status that manifests in response to the processor indicating non-receipt of the confirmation of completion within a second period of time.

7. The stylus of claim 6, wherein the one or more indicators comprises a light.

8. The stylus of claim 6, wherein the one or more indicators comprises a display.

9. The stylus of claim 6, wherein the one or more indicators comprises a speaker.

10. The stylus of claim 6, wherein the one or more indicators comprises a vibrating element.

11. The stylus of claim 1, wherein the remote data wipe function is activated by inputting a code into the stylus, wherein the code is communicated to the computing device via a communication network.

12. The stylus of claim 11 wherein the code is user-configurable.

13. The stylus of claim 1 wherein the remote data wipe function is further configured to launch a data back-up application prior to wiping data from the computing device.

14. The stylus of claim 1, wherein:
the input control feature further comprises a microphone; and
the user action for instructing the computing device to execute the remote data wipe function is a voice instruction received at the microphone.

15. A method for interacting with a remote target computing device that is out of control of a user due to loss or theft via a communicatively paired stylus that is within control of the user, the method comprising:
receiving, at the stylus, a user input at a user input control feature of the stylus, the user input generating an instruction to transmit a wipe data command to the remote target computing device;
transmitting, via a communication network, the wipe data command from the stylus to the remote target computing device, the wipe data command configured to remotely wipe data from the remote target computing device in response to the wipe data command, the remote wiping initiated within a first period of time following receipt of the wipe data command, the remote wiping rendering all data stored in the remote target computing device irretrievably unavailable;
receiving, via the communication network, a corresponding confirmation of completion of the data wipe from the remote target computing device; and
indicating, at the stylus, a completed status that manifests in response to receipt of the confirmation of completion.

16. The method of claim 15, wherein the user input received at the stylus by the user input control feature comprises turning the user input control feature at least once in a clockwise direction about a longitudinal axis and at least once in a counter-clockwise direction about the longitudinal axis.

17. A non-transitory computer program product comprising a plurality of instructions encoded thereon that when executed by one or more processors cause a process to be carried out, the process comprising:
receiving, at a stylus, a user input at a user input control feature of the stylus;
generating, at the stylus and in response to the user input, an instruction to transmit a wipe data command to a remote target computing device, the remote target computing device out of control of a user from loss or theft;
causing transmission, via a communication network, of the wipe data command from the stylus to the remote target computing device, the wipe data command configured to remotely wipe data from the remote target computing device in response to the wipe data command, the remote wiping initiated within a first period of time following receipt of the wipe data command, the remote wiping rendering all data stored in the remote target computing device irretrievably unavailable;
receiving, via the communication network, a corresponding confirmation of completion of the data wipe from the remote target computing device; and
causing, at the stylus, indication of a completed status in response to receipt of the confirmation of completion.

18. The non-transitory computer program product of claim 17, the process further comprising at least one of:
causing display of a message on the remote target computing device after data has been wiped from the device;
causing, at the stylus, indication that the wipe data command has been initiated; and
causing, at the stylus, indication that data wiping is under way.

19. The non-transitory computer program product of claim 17, further comprising:
transmitting, via the communication network, an instruction to launch a back-up application configured to remotely back-up data of the remote target computing device before executing the wipe data command.

* * * * *